United States Patent
Talmor et al.

(10) Patent No.: US 10,721,269 B1
(45) Date of Patent: Jul. 21, 2020

(54) METHODS AND SYSTEM FOR RETURNING REQUESTS WITH JAVASCRIPT FOR CLIENTS BEFORE PASSING A REQUEST TO A SERVER

(75) Inventors: Ron Talmor, Cupertino, CA (US); Nir Shahaf, Rehovot (IL); Orna Zackaria, Ramat Gan (IL)

(73) Assignee: F5 NETWORKS, INC., Seattle, WA (US)

( * ) Notice: Subject to any disclaimer, the term of this patent is extended or adjusted under 35 U.S.C. 154(b) by 174 days.

(21) Appl. No.: 12/614,373

(22) Filed: Nov. 6, 2009

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *H04L 29/08* | (2006.01) |

(52) U.S. Cl.
CPC ...... *H04L 63/1458* (2013.01); *H04L 67/1004* (2013.01)

(58) Field of Classification Search
CPC .............. H04L 63/1458; H04L 9/3271; H04L 67/1004–67/1038; H04L 63/14–63/168; G06F 2221/2103; G06F 11/3409–11/3438
USPC .................. 726/4, 11–13, 22–24, 25, 26–29
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,897,781 A | 1/1990 | Chang et al. | |
| 4,965,772 A | 10/1990 | Daniel et al. | |
| 4,993,030 A | 2/1991 | Krakauer et al. | |
| 5,023,826 A | 6/1991 | Patel | |
| 5,053,953 A | 10/1991 | Patel | |
| 5,167,024 A | 11/1992 | Smith et al. | |
| 5,218,695 A | 6/1993 | Noveck et al. | |
| 5,282,201 A | 1/1994 | Frank et al. | |
| 5,299,312 A | 3/1994 | Rocco, Jr. | |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

U.S. Appl. No. 12/018,031 entitled "DNS Flood Protection Platform for a Network", filed Jan. 22, 2008.

(Continued)

*Primary Examiner* — Trong H Nguyen
(74) *Attorney, Agent, or Firm* — Pepper Hamilton LLP

(57) ABSTRACT

Client requests for server resources are received by a network traffic management device (NTMD). The NTMD initially responds to the client requests on behalf of the associated servers. The initial responses include client side language scripts for execution by the clients. Executing the scripts causes the clients to resend their initial requests identified as a potential attack by the NTMD along with information indicating the client's legitimacy, such as the result of a computational JavaScript challenge. The NTMD receives the resent initial request, determines it was sent from a legitimate requestor and is therefore not an attack, and forwards it to the associate server.

20 Claims, 4 Drawing Sheets

(56) References Cited

U.S. PATENT DOCUMENTS

| | | |
|---|---|---|
| 5,303,368 A | 4/1994 | Kotaki |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,473,362 A | 12/1995 | Fitzgerald et al. |
| 5,475,857 A | 12/1995 | Dally |
| 5,511,177 A | 4/1996 | Kagimasa et al. |
| 5,515,523 A | 5/1996 | Kalkunte et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,548,724 A | 8/1996 | Akizawa et al. |
| 5,550,816 A | 8/1996 | Hardwick et al. |
| 5,550,965 A | 8/1996 | Gabbe et al. |
| 5,557,755 A | 9/1996 | Krein et al. |
| 5,560,016 A | 9/1996 | Fiebrich et al. |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,617,545 A | 4/1997 | Ogata et al. |
| 5,623,490 A | 4/1997 | Richter et al. |
| 5,649,194 A | 7/1997 | Miller et al. |
| 5,649,200 A | 7/1997 | Leblang et al. |
| 5,663,018 A | 9/1997 | Cummings et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,752,023 A | 5/1998 | Choucri et al. |
| 5,754,800 A | 5/1998 | Lentz et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,806,061 A | 9/1998 | Chaudhuri et al. |
| 5,812,550 A | 9/1998 | Sohn et al. |
| 5,825,772 A | 10/1998 | Dobbins et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,875,296 A | 2/1999 | Shi et al. |
| 5,884,303 A | 3/1999 | Brown |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,919,247 A | 7/1999 | Van Hoff et al. |
| 5,920,873 A | 7/1999 | Van Huben et al. |
| 5,936,939 A | 8/1999 | Des Jardins et al. |
| 5,937,406 A | 8/1999 | Balabine et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 5,996,037 A | 11/1999 | Emnett |
| 5,999,664 A | 12/1999 | Mahoney et al. |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,452 A | 2/2000 | Pitts |
| 6,026,459 A | 2/2000 | Huppenthal |
| 6,026,500 A | 2/2000 | Topff et al. |
| 6,028,857 A | 2/2000 | Poor |
| 6,029,168 A | 2/2000 | Frey |
| 6,029,175 A | 2/2000 | Chow et al. |
| 6,038,630 A | 3/2000 | Foster et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,051,169 A | 4/2000 | Brown et al. |
| 6,067,558 A | 5/2000 | Wendt et al. |
| 6,072,942 A | 6/2000 | Stockwell et al. |
| 6,073,199 A | 6/2000 | Cohen et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,627 A | 10/2000 | Mattis et al. |
| 6,128,657 A | 10/2000 | Okanoya et al. |
| 6,128,717 A | 10/2000 | Harrison et al. |
| 6,154,777 A | 11/2000 | Ebrahim |
| 6,157,950 A | 12/2000 | Krishnan |
| 6,160,874 A | 12/2000 | Dickerman et al. |
| 6,161,145 A | 12/2000 | Bainbridge et al. |
| 6,161,185 A | 12/2000 | Guthrie et al. |
| 6,170,022 B1 | 1/2001 | Linville et al. |
| 6,178,423 B1 | 1/2001 | Douceur et al. |
| 6,181,336 B1 | 1/2001 | Chiu et al. |
| 6,182,139 B1 | 1/2001 | Brendel |
| 6,185,647 B1 | 2/2001 | Shibuya |
| 6,192,051 B1 | 2/2001 | Lipman et al. |
| 6,223,206 B1 | 4/2001 | Dan et al. |
| 6,226,702 B1 | 5/2001 | Yakashiro |
| 6,233,612 B1 | 5/2001 | Fruchtman et al. |
| 6,233,648 B1 | 5/2001 | Tomita |
| 6,237,008 B1 | 5/2001 | Beal et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,256,031 B1 | 7/2001 | Meijer et al. |
| 6,259,405 B1 | 7/2001 | Stewart et al. |
| 6,260,070 B1 | 7/2001 | Shah |
| 6,263,368 B1 | 7/2001 | Martin |
| 6,282,610 B1 | 8/2001 | Bergsten |
| 6,289,012 B1 | 9/2001 | Harrington et al. |
| 6,289,345 B1 | 9/2001 | Yasue |
| 6,292,832 B1 | 9/2001 | Shah et al. |
| 6,298,380 B1 | 10/2001 | Coile et al. |
| 6,304,913 B1 | 10/2001 | Rune |
| 6,308,162 B1 | 10/2001 | Ouimet et al. |
| 6,311,278 B1 | 10/2001 | Raanan et al. |
| 6,324,581 B1 | 11/2001 | Xu et al. |
| 6,324,616 B2 | 11/2001 | Chrysos et al. |
| 6,327,622 B1 | 12/2001 | Jindal et al. |
| 6,330,574 B1 | 12/2001 | Murashita |
| 6,338,082 B1 | 1/2002 | Schneider |
| 6,339,785 B1 | 1/2002 | Feigenbaum |
| 6,343,324 B1 | 1/2002 | Hubis et al. |
| 6,347,339 B1 | 2/2002 | Morris et al. |
| 6,349,343 B1 | 2/2002 | Foody et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,363,445 B1 | 3/2002 | Jeddeloh |
| 6,370,527 B1 | 4/2002 | Singhal |
| 6,370,543 B2 | 4/2002 | Hoffert et al. |
| 6,374,263 B1 | 4/2002 | Bunger et al. |
| 6,374,300 B2 | 4/2002 | Masters |
| 6,389,433 B1 | 5/2002 | Bolosky et al. |

(56) References Cited

U.S. PATENT DOCUMENTS

| | | |
|---|---|---|
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,411,986 B1 | 6/2002 | Susai et al. |
| 6,412,004 B1 | 6/2002 | Chen et al. |
| 6,430,562 B1 | 8/2002 | Kardos et al. |
| 6,434,081 B1 | 8/2002 | Johnson et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,480,476 B1 | 11/2002 | Willars |
| 6,484,261 B1 | 11/2002 | Wiegel |
| 6,487,561 B1 | 11/2002 | Ofek et al. |
| 6,490,624 B1 | 12/2002 | Sampson et al. |
| 6,493,804 B1 | 12/2002 | Soltis et al. |
| 6,499,090 B1 | 12/2002 | Hill et al. |
| 6,505,242 B2 | 1/2003 | Holland et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,513,082 B1 | 1/2003 | Fischer et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,519,643 B1 | 2/2003 | Foulkes et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,601,101 B1 | 7/2003 | Lee et al. |
| 6,612,490 B1 | 9/2003 | Herrendoerfer et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,718,380 B1 | 4/2004 | Mohaban et al. |
| 6,721,794 B2 | 4/2004 | Taylor et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,748,420 B1 | 6/2004 | Quatrano et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,779,039 B1 | 8/2004 | Bommareddy et al. |
| 6,781,986 B1 | 8/2004 | Sabaa et al. |
| 6,782,450 B2 | 8/2004 | Arnott et al. |
| 6,795,860 B1 | 9/2004 | Shah |
| 6,798,777 B1 | 9/2004 | Ferguson et al. |
| 6,801,960 B1 | 10/2004 | Ericson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,613 B1 | 11/2004 | Wang et al. |
| 6,826,698 B1 | 11/2004 | Minkin et al. |
| 6,829,238 B2 | 12/2004 | Tokuyo et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,857,009 B1 | 2/2005 | Ferreria |
| 6,857,046 B1 | 2/2005 | Batcher |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,886,132 B1 | 4/2005 | Hall et al. |
| 6,888,836 B1 | 5/2005 | Cherkasova |
| 6,889,249 B2 | 5/2005 | Miloushev et al. |
| 6,904,040 B2 | 6/2005 | Salapura et al. |
| 6,914,881 B1 | 7/2005 | Mansfield et al. |
| 6,922,688 B1 | 7/2005 | Frey, Jr. |
| 6,928,082 B2 | 8/2005 | Liu et al. |
| 6,928,518 B2 | 8/2005 | Talagala |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,502 B2 | 2/2006 | Lin |
| 7,006,981 B2 | 2/2006 | Rose et al. |
| 7,007,092 B2 | 2/2006 | Peiffer |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,020,713 B1 | 3/2006 | Shah et al. |
| 7,023,974 B1 | 4/2006 | Brannam et al. |
| 7,024,427 B2 | 4/2006 | Bobbitt et al. |
| 7,032,002 B1 | 4/2006 | Rezvani |
| 7,035,212 B1 | 4/2006 | Mitial et al. |
| 7,039,061 B2 | 5/2006 | Connor et al. |
| 7,051,112 B2 | 5/2006 | Dawson |
| 7,054,998 B2 | 5/2006 | Arnott et al. |
| 7,055,010 B2 | 5/2006 | Lin et al. |

(56) References Cited

U.S. PATENT DOCUMENTS

| | | |
|---|---|---|
| 7,058,633 B1 | 6/2006 | Gnagy et al. |
| 7,065,482 B2 | 6/2006 | Shorey et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,944 B2 | 11/2006 | Song et al. |
| 7,133,967 B2 | 11/2006 | Fujie et al. |
| 7,139,792 B1 | 11/2006 | Mishra et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,155,722 B1 | 12/2006 | Hilla et al. |
| 7,161,904 B2 | 1/2007 | Hussain et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |
| 7,185,359 B2 | 2/2007 | Schmidt et al. |
| 7,191,163 B2 | 3/2007 | Herrera et al. |
| 7,194,579 B2 | 3/2007 | Robinson et al. |
| 7,197,639 B1 * | 3/2007 | Juels et al. ............... 713/168 |
| 7,228,359 B1 | 6/2007 | Monteiro |
| 7,228,422 B2 | 6/2007 | Morioka et al. |
| 7,234,074 B2 | 6/2007 | Cohn et al. |
| 7,236,491 B2 | 6/2007 | Tsao et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,257,633 B2 | 8/2007 | Masputra et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,284,150 B2 | 10/2007 | Ma et al. |
| 7,287,082 B1 | 10/2007 | O'Toole, Jr. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,293,281 B1 | 11/2007 | Moran |
| 7,295,827 B2 | 11/2007 | Liu et al. |
| 7,296,061 B2 | 11/2007 | Martinez et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,308,648 B1 | 12/2007 | Buchthal |
| 7,308,703 B2 | 12/2007 | Wright et al. |
| 7,308,709 B1 | 12/2007 | Brezak et al. |
| 7,310,339 B1 | 12/2007 | Powers et al. |
| 7,321,926 B1 | 1/2008 | Zhang et al. |
| 7,324,533 B1 | 1/2008 | DeLiberato et al. |
| 7,330,486 B2 | 2/2008 | Ko et al. |
| 7,333,999 B1 | 2/2008 | Njemanze |
| 7,340,571 B2 | 3/2008 | Saze |
| 7,343,413 B2 | 3/2008 | Gilde et al. |
| 7,346,664 B2 | 3/2008 | Wong et al. |
| 7,349,391 B2 | 3/2008 | Ben-Dor et al. |
| 7,373,438 B1 | 5/2008 | DeBergalis et al. |
| 7,383,288 B2 | 6/2008 | Miloushev et al. |
| 7,383,570 B2 | 6/2008 | Pinkas et al. |
| 7,398,552 B2 | 7/2008 | Pardee et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,433,962 B2 | 10/2008 | Janssen et al. |
| 7,437,358 B2 | 10/2008 | Arrouye et al. |
| 7,440,982 B2 | 10/2008 | Lu et al. |
| 7,454,480 B2 | 11/2008 | Labio et al. |
| 7,457,982 B2 | 11/2008 | Rajan |
| 7,467,158 B2 | 12/2008 | Marinescu |
| 7,468,979 B2 | 12/2008 | Ricciulli |
| 7,475,241 B2 | 1/2009 | Patel et al. |
| 7,477,796 B2 | 1/2009 | Sasaki et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,509,322 B2 | 3/2009 | Miloushev et al. |
| 7,512,673 B2 | 3/2009 | Miloushev et al. |
| 7,516,492 B1 | 4/2009 | Nisbet et al. |
| 7,519,813 B1 | 4/2009 | Cox et al. |
| 7,522,581 B2 | 4/2009 | Acharya et al. |
| 7,526,541 B2 | 4/2009 | Roese et al. |
| 7,555,608 B2 | 6/2009 | Naik et al. |
| 7,558,197 B1 | 7/2009 | Sindhu et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,577,758 B2 | 8/2009 | Ricciulli |
| 7,580,971 B1 | 8/2009 | Gollapudi et al. |
| 7,584,393 B2 | 9/2009 | Kamada et al. |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,624,424 B2 | 11/2009 | Morita et al. |
| 7,639,883 B2 | 12/2009 | Gill |
| 7,640,347 B1 | 12/2009 | Sloat et al. |
| 7,644,109 B2 | 1/2010 | Manley et al. |
| 7,644,137 B2 | 1/2010 | Bozak et al. |
| 7,653,699 B1 | 1/2010 | Colgrove et al. |
| 7,668,166 B1 | 2/2010 | Rekhter et al. |
| 7,680,915 B2 | 3/2010 | Still et al. |
| 7,684,423 B2 | 3/2010 | Tripathi et al. |
| 7,689,596 B2 | 3/2010 | Tsunoda |
| 7,689,710 B2 | 3/2010 | Tang et al. |
| 7,694,082 B2 | 4/2010 | Golding et al. |
| 7,698,458 B1 | 4/2010 | Lui et al. |
| 7,710,867 B1 | 5/2010 | Masters |
| 7,711,771 B2 | 5/2010 | Kirnos |
| 7,724,657 B2 | 5/2010 | Rao et al. |
| 7,725,093 B2 | 5/2010 | Sengupta et al. |
| 7,734,603 B1 | 6/2010 | McManis |
| 7,739,540 B2 | 6/2010 | Akutsu et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,774,492 B2 | 8/2010 | Raphel et al. |
| 7,778,187 B2 | 8/2010 | Chaturvedi et al. |
| 7,788,335 B2 | 8/2010 | Miloushev et al. |
| 7,808,913 B2 | 10/2010 | Ansari et al. |
| 7,822,839 B1 | 10/2010 | Pruitt et al. |
| 7,822,939 B1 | 10/2010 | Veprinsky et al. |
| 7,831,639 B1 | 11/2010 | Panchbudhe et al. |
| 7,831,662 B2 | 11/2010 | Clark et al. |
| 7,849,112 B2 | 12/2010 | Mane et al. |
| 7,860,815 B1 | 12/2010 | Tangirala |
| 7,861,085 B1 | 12/2010 | Case et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,895,653 B2 | 2/2011 | Calo et al. |
| 7,900,002 B2 | 3/2011 | Lyon |

(56) References Cited

U.S. PATENT DOCUMENTS

| | | |
|---|---|---|
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,913,053 B1 | 3/2011 | Newland |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,984,141 B2 | 7/2011 | Gupta et al. |
| 7,984,500 B1 | 7/2011 | Khanna et al. |
| 8,001,246 B2 | 8/2011 | Lu et al. |
| 8,005,953 B2 | 8/2011 | Miloushev et al. |
| 8,015,157 B2 | 9/2011 | Kamei et al. |
| 8,024,443 B1 | 9/2011 | Jacob |
| 8,037,528 B2 | 10/2011 | Williams et al. |
| 8,055,724 B2 | 11/2011 | Amegadzie et al. |
| 8,064,342 B2 | 11/2011 | Badger |
| 8,069,225 B2 | 11/2011 | McCanne et al. |
| 8,099,758 B2 | 1/2012 | Schaefer et al. |
| 8,103,781 B1 | 1/2012 | Wu et al. |
| 8,112,308 B1 | 2/2012 | Ho et al. |
| 8,117,244 B2 | 2/2012 | Marinov et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,239,954 B2 | 8/2012 | VVobber et al. |
| 8,261,351 B1 | 9/2012 | Thornewell et al. |
| 8,271,620 B2 | 9/2012 | Witchey |
| 8,274,895 B2 | 9/2012 | Rahman et al. |
| 8,285,808 B1 | 10/2012 | Joel |
| 8,321,908 B2 | 11/2012 | Gai et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,400,923 B2 | 3/2013 | Kini |
| 8,407,576 B1 | 3/2013 | Yin et al. |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,267 B2 | 6/2013 | Yigang |
| 8,484,348 B2 | 7/2013 | Subramanian et al. |
| 8,359,224 B2 | 9/2013 | Henderson et al. |
| 8,533,308 B1 | 9/2013 | Rothstein |
| 8,566,474 B2 | 10/2013 | Kanode et al. |
| 8,578,050 B2 | 11/2013 | Craig et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,969 B2 | 3/2014 | Kay |
| 8,682,946 B1 | 3/2014 | Hiriyannaiah |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,824,480 B2 | 9/2014 | Hampel |
| 8,830,874 B2 | 9/2014 | Cho et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,954,492 B1 | 2/2015 | Lowell, Jr. |
| 8,959,215 B2 | 2/2015 | Koponen et al. |
| 9,036,529 B2 | 5/2015 | Erickson et al. |
| 9,037,166 B2 | 5/2015 | de Wit et al. |
| 9,083,760 B1 | 7/2015 | Hughes et al. |
| 9,143,451 B2 | 9/2015 | Amdahl et al. |
| 9,218,267 B1 | 12/2015 | Keller |
| 9,244,843 B1 | 1/2016 | Michels et al. |
| 9,294,548 B2 | 3/2016 | Cui et al. |
| 9,456,464 B2 | 9/2016 | Biswas et al. |
| 9,497,614 B1 | 11/2016 | Ridel et al. |
| 9,503,223 B2 | 11/2016 | Wu et al. |
| 9,578,055 B1 | 2/2017 | Khanal |
| 9,674,054 B2 | 6/2017 | Scharf et al. |
| 9,843,646 B2 | 12/2017 | Roeland et al. |
| 9,930,013 B2 | 3/2018 | Ossipov |
| 2001/0000083 A1 | 3/2001 | Crow et al. |
| 2001/0007560 A1 | 7/2001 | Masuda et al. |
| 2001/0009554 A1 | 7/2001 | Katseff et al. |
| 2001/0023442 A1 | 9/2001 | Masters |
| 2001/0047293 A1 | 11/2001 | Waller et al. |
| 2002/0010757 A1 | 1/2002 | Granik et al. |
| 2002/0010783 A1 | 1/2002 | Primak et al. |
| 2002/0012352 A1 | 1/2002 | Hanson et al. |
| 2002/0032758 A1 | 3/2002 | Yen et al. |
| 2002/0032777 A1 | 3/2002 | Kawata et al. |
| 2002/0035537 A1 | 3/2002 | Waller et al. |
| 2002/0038360 A1 | 3/2002 | Andrews et al. |
| 2002/0046291 A1 | 4/2002 | O'Callaghan et al. |
| 2002/0049842 A1 | 4/2002 | Huetsch et al. |
| 2002/0059263 A1 | 5/2002 | Shima et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0112061 A1 | 8/2002 | Shih et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0150253 A1 | 10/2002 | Brezak et al. |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188753 A1 | 12/2002 | Tang et al. |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0018927 A1 | 1/2003 | Gadir et al. |
| 2003/0023743 A1* | 1/2003 | Raphel et al. ............... 709/232 |
| 2003/0028514 A1 | 2/2003 | Lord et al. |
| 2003/0033308 A1 | 2/2003 | Patel et al. |
| 2003/0033369 A1 | 2/2003 | Bernhard |
| 2003/0033535 A1 | 2/2003 | Fisher et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0046335 A1 | 3/2003 | Doyle et al. |
| 2003/0051045 A1 | 3/2003 | Connor |
| 2003/0055723 A1 | 3/2003 | English |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |

(56) References Cited

U.S. PATENT DOCUMENTS

| | | |
|---|---|---|
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0130945 A1 | 7/2003 | Force et al. |
| 2003/0131052 A1 | 7/2003 | Allan |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0159072 A1 | 8/2003 | Bellinger et al. |
| 2003/0163576 A1 | 8/2003 | Janssen et al. |
| 2003/0171978 A1 | 9/2003 | Jenkins et al. |
| 2003/0177388 A1 | 9/2003 | Botz et al. |
| 2003/0179755 A1 | 9/2003 | Fraser |
| 2003/0189936 A1 | 10/2003 | Terrell et al. |
| 2003/0191803 A1 | 10/2003 | Chinnici et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0200289 A1 | 10/2003 | Kemp et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003266 A1 | 1/2004 | Moshir et al. |
| 2004/0003287 A1 | 1/2004 | Zissimopoulos et al. |
| 2004/0006575 A1 | 1/2004 | Visharam et al. |
| 2004/0006591 A1 | 1/2004 | Matsui et al. |
| 2004/0006741 A1 | 1/2004 | Radja et al. |
| 2004/0010654 A1 | 1/2004 | Yasuda et al. |
| 2004/0015463 A1 | 1/2004 | Herrera et al. |
| 2004/0015783 A1 | 1/2004 | Lennon et al. |
| 2004/0017825 A1 | 1/2004 | Stanwood et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0103206 A1 | 5/2004 | Hsu et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0133606 A1 | 7/2004 | Miloushev et al. |
| 2004/0138858 A1 | 7/2004 | Carley |
| 2004/0139355 A1 | 7/2004 | Axel et al. |
| 2004/0143670 A1* | 7/2004 | Roychowdhury et al. ... 709/229 |
| 2004/0141185 A1 | 8/2004 | Akama |
| 2004/0151186 A1 | 8/2004 | Akama |
| 2004/0153479 A1 | 8/2004 | Mikesell et al. |
| 2004/0167967 A1 | 8/2004 | Bastian et al. |
| 2004/0177165 A1 | 9/2004 | Masputra et al. |
| 2004/0192312 A1 | 9/2004 | Li et al. |
| 2004/0199762 A1 | 10/2004 | Carlson et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0225656 A1 | 11/2004 | Sarkar |
| 2004/0236798 A1 | 11/2004 | Srinivasan et al. |
| 2004/0236826 A1 | 11/2004 | Harville et al. |
| 2004/0255000 A1 | 12/2004 | Simionescu et al. |
| 2004/0260745 A1 | 12/2004 | Gage et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0028080 A1 | 2/2005 | Challenger et al. |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0091214 A1 | 4/2005 | Probert et al. |
| 2005/0108575 A1 | 5/2005 | Yung |
| 2005/0117589 A1 | 6/2005 | Dowdy et al. |
| 2005/0122977 A1 | 6/2005 | Lieberman |
| 2005/0154837 A1 | 7/2005 | Keohane et al. |
| 2005/0160153 A1 | 7/2005 | Knutson et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0246717 A1 | 11/2005 | Poole et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0288939 A1 | 12/2005 | Peled et al. |
| 2005/0289111 A1 | 12/2005 | Tribble et al. |
| 2006/0010502 A1 | 1/2006 | Mimatsu et al. |
| 2006/0015846 A1 | 1/2006 | Fraleigh et al. |
| 2006/0031374 A1 | 2/2006 | Lu et al. |
| 2006/0031520 A1 | 2/2006 | Bedekar et al. |
| 2006/0031670 A1 | 2/2006 | Price, II |
| 2006/0031778 A1 | 2/2006 | Goodwin et al. |
| 2006/0036764 A1 | 2/2006 | Yokota et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0075475 A1 | 4/2006 | Boulos et al. |
| 2006/0077902 A1 | 4/2006 | Kannan et al. |
| 2006/0077986 A1 | 4/2006 | Rune |
| 2006/0080353 A1 | 4/2006 | Miloushev et al. |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123062 A1 | 6/2006 | Bobbitt et al. |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0167838 A1 | 7/2006 | Lacapra |
| 2006/0168070 A1 | 7/2006 | Thompson et al. |
| 2006/0171365 A1 | 8/2006 | Borella |

(56) References Cited

U.S. PATENT DOCUMENTS

| | | |
|---|---|---|
| 2006/0179153 A1 | 8/2006 | Lee et al. |
| 2006/0182103 A1 | 8/2006 | Martini et al. |
| 2006/0184589 A1 | 8/2006 | Lees et al. |
| 2006/0184647 A1 | 8/2006 | Dixit et al. |
| 2006/0200470 A1 | 9/2006 | Lacapra et al. |
| 2006/0206589 A1 | 9/2006 | Lentini |
| 2006/0209669 A1 | 9/2006 | Nishio |
| 2006/0209853 A1 | 9/2006 | Hidaka et al. |
| 2006/0224687 A1 | 10/2006 | Popkin et al. |
| 2006/0229861 A1 | 10/2006 | Tatsuoka et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0235976 A1 | 10/2006 | Chen et al. |
| 2006/0235998 A1 | 10/2006 | Stechler et al. |
| 2006/0242300 A1 | 10/2006 | Yumoto et al. |
| 2006/0259320 A1 | 11/2006 | LaSalle et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0277606 A1 | 12/2006 | Yunus et al. |
| 2006/0282442 A1 | 12/2006 | Lennon et al. |
| 2006/0282471 A1 | 12/2006 | Mark et al. |
| 2006/0291388 A1 | 12/2006 | Amdahl et al. |
| 2006/0291483 A1 | 12/2006 | Bela |
| 2006/0294054 A1 | 12/2006 | Kudo et al. |
| 2007/0005807 A1 | 1/2007 | Wong |
| 2007/0006293 A1 | 1/2007 | Balakrishnan et al. |
| 2007/0011605 A1 | 1/2007 | Dumitru et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0038994 A1 | 2/2007 | Davis et al. |
| 2007/0297410 A1 | 2/2007 | Yoon et al. |
| 2007/0050843 A1 | 3/2007 | Manville et al. |
| 2007/0058670 A1 | 3/2007 | Konduru et al. |
| 2007/0064610 A1 | 3/2007 | Khandani et al. |
| 2007/0064661 A1 | 3/2007 | Sood et al. |
| 2007/0067373 A1 | 3/2007 | Higgins et al. |
| 2007/0067771 A1 | 3/2007 | Kulbak et al. |
| 2007/0067839 A1 | 3/2007 | Hamada et al. |
| 2007/0067841 A1 | 3/2007 | Yegneswaran et al. |
| 2007/0083646 A1 | 4/2007 | Miller et al. |
| 2007/0088702 A1 | 4/2007 | Fridella et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0147246 A1 | 6/2007 | Hurley et al. |
| 2007/0150574 A1 | 6/2007 | Mallal et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0192543 A1 | 8/2007 | Naik et al. |
| 2007/0208748 A1 | 9/2007 | Li |
| 2007/0209075 A1 | 9/2007 | Coffman |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khedouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0046432 A1 | 2/2008 | Anderson et al. |
| 2008/0065653 A1 | 3/2008 | Shneur et al. |
| 2008/0070575 A1 | 3/2008 | Claussen et al. |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0168150 A1 | 7/2008 | Chen et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |
| 2008/0209073 A1 | 8/2008 | Tang |
| 2008/0209524 A1 | 8/2008 | Almog et al. |
| 2008/0212499 A1 | 9/2008 | Maes |
| 2008/0222223 A1 | 9/2008 | Srinivasan et al. |
| 2008/0222646 A1 | 9/2008 | Sigal et al. |
| 2008/0225710 A1 | 9/2008 | Raja et al. |
| 2008/0228911 A1 | 9/2008 | Mackey |
| 2008/0229025 A1 | 9/2008 | Plamondon |
| 2008/0229415 A1 | 9/2008 | Kapoor et al. |
| 2008/0239986 A1 | 10/2008 | Ku et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0271046 A1 | 10/2008 | Lipton et al. |
| 2008/0279200 A1 | 11/2008 | Shatzkamer et al. |
| 2008/0281908 A1 | 11/2008 | McCanne et al. |
| 2008/0281944 A1 | 11/2008 | Vome et al. |
| 2008/0282047 A1 | 11/2008 | Arakawa et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0007162 A1 | 1/2009 | Sheehan |
| 2009/0028337 A1 | 1/2009 | Balabine et al. |
| 2009/0037975 A1 | 2/2009 | Ishikawa et al. |
| 2009/0037998 A1 | 2/2009 | Adhya et al. |
| 2009/0041230 A1 | 2/2009 | Williams |
| 2009/0049230 A1 | 2/2009 | Pandya |
| 2009/0055607 A1 | 2/2009 | Schack et al. |
| 2009/0070617 A1 | 3/2009 | Arimilli et al. |
| 2009/0077097 A1 | 3/2009 | Lacapra et al. |
| 2009/0077619 A1 | 3/2009 | Boyce |
| 2009/0080440 A1 | 3/2009 | Balyan et al. |
| 2009/0089344 A1 | 4/2009 | Brown et al. |
| 2009/0089487 A1 | 4/2009 | Kwon et al. |
| 2009/0094252 A1 | 4/2009 | Wong et al. |
| 2009/0094311 A1 | 4/2009 | Awadallah et al. |
| 2009/0094377 A1 | 4/2009 | Zahavi et al. |
| 2009/0094610 A1 | 4/2009 | Sukirya |
| 2009/0097480 A1 | 4/2009 | Curtis et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0119504 A1 | 5/2009 | Van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0132616 A1 | 5/2009 | Winter et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144285 A1 | 6/2009 | Chatley et al. |
| 2009/0144286 A1 | 6/2009 | Parkinson et al. |
| 2009/0157678 A1 | 6/2009 | Turk |

(56) References Cited

U.S. PATENT DOCUMENTS

| | | |
|---|---|---|
| 2009/0161542 A1 | 6/2009 | Ho |
| 2009/0187915 A1 | 7/2009 | Chew et al. |
| 2009/0193513 A1 | 7/2009 | Agarwal et al. |
| 2009/0196282 A1 | 8/2009 | Fellman et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0217163 A1 | 8/2009 | Jaroker |
| 2009/0217386 A1* | 8/2009 | Schneider ............ 726/30 |
| 2009/0228956 A1 | 9/2009 | He et al. |
| 2009/0241176 A1 | 9/2009 | Beletski et al. |
| 2009/0248870 A1 | 10/2009 | Kamei et al. |
| 2009/0265396 A1 | 10/2009 | Ram et al. |
| 2009/0265467 A1 | 10/2009 | Peles |
| 2009/0271690 A1 | 10/2009 | Iglesias |
| 2009/0276835 A1 | 11/2009 | Jackson |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2009/0327858 A1 | 12/2009 | Tsun |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0031315 A1* | 2/2010 | Feng et al. ............ 726/3 |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0093318 A1 | 4/2010 | Zhu et al. |
| 2010/0103820 A1 | 4/2010 | Fuller et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0138809 A1 | 6/2010 | Shenfield et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0189052 A1 | 7/2010 | Kavanagh et al. |
| 2010/0218253 A1 | 8/2010 | Sutton et al. |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251329 A1 | 9/2010 | Wei |
| 2010/0251330 A1 | 9/2010 | Kroeselberg et al. |
| 2010/0261479 A1 | 10/2010 | Hidaka |
| 2010/0274772 A1 | 10/2010 | Samuels |
| 2010/0278733 A1 | 11/2010 | Karsten et al. |
| 2010/0299451 A1 | 11/2010 | Yigang et al. |
| 2010/0306169 A1 | 12/2010 | Pishevar et al. |
| 2010/0306827 A1 | 12/2010 | Esteve Balducci et al. |
| 2010/0322250 A1 | 12/2010 | Shetty et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0087696 A1 | 4/2011 | Lacapra |
| 2011/0098087 A1 | 4/2011 | Tseng |
| 2011/0099294 A1 | 4/2011 | Kapur et al. |
| 2011/0106616 A1 | 5/2011 | Bigby |
| 2011/0107077 A1 | 5/2011 | Henderson et al. |
| 2011/0113095 A1 | 5/2011 | Hatami-Hanza |
| 2011/0153822 A1 | 6/2011 | Rajan et al. |
| 2011/0153985 A1 | 6/2011 | Saha et al. |
| 2011/0154443 A1 | 6/2011 | Thakur et al. |
| 2011/0173295 A1 | 7/2011 | Bakke et al. |
| 2011/0173453 A1 | 7/2011 | Parsell et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0213911 A1 | 9/2011 | Eldus et al. |
| 2011/0246634 A1 | 10/2011 | Liu et al. |
| 2011/0246800 A1 | 10/2011 | Accpadi et al. |
| 2011/0252475 A1 | 10/2011 | Mui |
| 2011/0273984 A1 | 11/2011 | Hsu et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030224 A1 | 2/2012 | Cohen |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0094631 A1 | 4/2012 | Pattabiraman |
| 2012/0101952 A1 | 4/2012 | Raleigh et al. |
| 2012/0102011 A1 | 4/2012 | Matsuki et al. |
| 2012/0117028 A1 | 5/2012 | Gold et al. |
| 2012/0150805 A1 | 6/2012 | Pafumi et al. |
| 2012/0191847 A1 | 7/2012 | Nas et al. |
| 2012/0195273 A1 | 8/2012 | Iwamura et al. |
| 2012/0224531 A1 | 9/2012 | Karuturi et al. |
| 2012/0226802 A1 | 9/2012 | Wu et al. |
| 2012/0254293 A1 | 10/2012 | Winter et al. |
| 2012/0257506 A1 | 10/2012 | BazIamacci et al. |
| 2012/0258766 A1 | 10/2012 | Cho et al. |
| 2012/0278445 A1 | 11/2012 | Sagara |
| 2012/0278851 A1 | 11/2012 | Dan |
| 2012/0311153 A1 | 12/2012 | Morgan |
| 2012/0317266 A1 | 12/2012 | Abbott |
| 2012/0331160 A1 | 12/2012 | Tremblay et al. |
| 2013/0029726 A1 | 1/2013 | Berionne et al. |
| 2013/0031060 A1 | 1/2013 | Lowery et al. |
| 2013/0058229 A1 | 3/2013 | Casado et al. |
| 2013/0073717 A1 | 3/2013 | Collin et al. |
| 2013/0091002 A1 | 4/2013 | Christie et al. |
| 2013/0114497 A1 | 5/2013 | Zhang et al. |
| 2013/0182713 A1 | 7/2013 | Giacomoni et al. |
| 2013/0205361 A1 | 8/2013 | Narayanaswamy et al. |
| 2013/0238472 A1 | 9/2013 | Fan et al. |
| 2013/0336122 A1 | 12/2013 | Baruah et al. |
| 2014/0025823 A1 | 1/2014 | Szabo et al. |
| 2014/0040478 A1 | 2/2014 | Hsu et al. |
| 2014/0059678 A1 | 2/2014 | Parker |
| 2014/0071895 A1 | 3/2014 | Bane et al. |
| 2014/0095661 A1 | 4/2014 | Knowles et al. |
| 2014/0099945 A1 | 4/2014 | Singh et al. |
| 2014/0105069 A1 | 4/2014 | Potnuru |
| 2014/0162705 A1 | 6/2014 | de Wit et al. |
| 2014/0171089 A1 | 6/2014 | Janakiraman et al. |
| 2014/0181787 A1 | 6/2014 | Hristov |
| 2014/0187199 A1 | 7/2014 | Yan et al. |
| 2014/0269484 A1 | 9/2014 | Dankberg et al. |
| 2014/0280515 A1 | 9/2014 | Wei |
| 2014/0282464 A1 | 9/2014 | El-Gillani |
| 2014/0286316 A1 | 9/2014 | Park et al. |
| 2014/0317404 A1 | 10/2014 | Carlson et al. |
| 2014/0321462 A1 | 10/2014 | Kancherla et al. |
| 2014/0365680 A1 | 12/2014 | van Bemmel |
| 2015/0058595 A1 | 2/2015 | Gura et al. |
| 2015/0095502 A1 | 4/2015 | Le Bolzer et al. |
| 2015/0263959 A1 | 9/2015 | Patwardhan et al. |
| 2015/0319270 A1 | 11/2015 | Roeland et al. |
| 2016/0142373 A1 | 5/2016 | Ossipov |

(56) References Cited

U.S. PATENT DOCUMENTS

FOREIGN PATENT DOCUMENTS

| | | | |
|---|---|---|---|
| CA | 2512312 A1 | 7/2004 |
| EP | 0605088 A3 | 7/1994 |
| EP | 0 738 970 A1 | 10/1996 |
| EP | 0744850 A2 | 11/1996 |
| EP | 1081918 A2 | 3/2001 |
| JP | 63010250 A | 1/1988 |
| JP | 06-205006 | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000183935 | 6/2000 |
| NZ | 566291 A | 12/2008 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 A2 | 10/2000 |
| WO | WO 02/39696 A2 | 5/2002 |
| WO | WO 02/056181 A2 | 7/2002 |
| WO | WO 2004/061605 A2 | 7/2004 |
| WO | WO 2006/091040 A1 | 8/2006 |
| WO | WO 2008/130983 A1 | 10/2008 |
| WO | WO 2008/147973 A2 | 12/2008 |

OTHER PUBLICATIONS

U.S. Appl. No. 10/444,279 entitled "System and Method for Managing Traffic to a Probe", filed May 23, 2003.
U.S. Appl. No. 12/357,372 entitled "Thwarting Drone-Waged Denial of Service Attacks on a Network", filed Jan. 21, 2009.
Amendment and Response to Office Action filed Sep. 11, 2009 for U.S. Appl. No. 10/444,279.
"Tetheral—Dump and analyze network traffic", www.ethereal.com/docs/man-pages/tethereal.1.html.
"Network Sniffer", www.linuxmigration.com/quickref/admin/ethereal.html.
"The-binary Advisory," The Honeynet Project, 4 pages, http//www.honeynet.org/reverse/results/sol/sol-17/advisory.html (accessed Feb. 20, 2008).
"A Storage Architecture Guide," Second Edition, 2001, Auspex Systems, Inc., www.auspex.com, last accessed on Dec. 30, 2002.
"Canonical Name Record (CNAME)," CNAME Record: Chapter 8, Zy Trax, Inc., 3 pages, http://www.zytrax.com/books/dns/ch8/cname.html.
"CSA Persistent File System Technology," A White Paper, Jan. 1, 1999, pp. 1-3, http://www.cosoa.com/white_papers/pfs.php, Colorado Software Architecture, Inc.
"Denial-of-service attack" Wikipedia, the free encyclopedia, 10 pages, http://en.wikipedia.org/w/index.php?title=Denial-of-service_attack&printable=yes (accessed Nov. 5, 2007).
"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).
"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

"editcap—Edit and/or translate the format of capture files", www.ethereal.com/docs/man-pages/editcap.1.html.
"ethereal Interactively browse network traffic", www.ethereal.com/docs/man-pages/ethereal.1.html.
"FAQ: Network Intrusion Detection Systems", www.robertgraham.com/pubs/network-intrusion-detection.html.
"Canonical Name Record (CNAME)," CNAME Record: Chapter 8, Zy Trax, Inc., 3 pages, http://www.zytrax.com/books/dns/ch8/cname.html (2008).
"editcap—Edit and/or translate the format of capture files", www.ethereal.com/docs/man-pages/editcap.1.html (2004).
"ethereal Interactively browse network traffic", www.ethereal.com/docs/man-pages/ethereal.1.html (2004).
"FAQ: Network Intrusion Detection Systems", www.robertgraham.com/pubs/network-intrusion-detection.html (2000).
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.
"Network Sniffer", www.linuxmigration.com/quickref/admin/ethereal.1.html; 4 pages, last accessed Apr. 15, 2004.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
"Scaling Next Generation Web Infrastructure with Content-Intelligent Switching: White Paper," Apr. 2000, pp. 1-9, Alteon Web Systems, Inc.
"Surviving DNS DDoS Attacks: Introducing self-protecting servers," white paper, Secure64 Software Corporation, Mar. 19, 2007. (18 pages).
"tethereal—Dump and analyze network traffic", www.ethereal.com/docs/man-pages/tethereal.1.html; 11 pages, last accessed Apr. 15, 2004.
"The AFS File System in Distributed Computing Environment," www.transarc.ibm.com/Library/whitepapers/AFS/afsoverview.html, last accessed on Dec. 20, 2002, 6 pages.
"the-binary Advisory," The Honeynet Project, 5 pages, http//www.honeynet.org/reverse/results/sol/sol-17/advisory.html (accessed Feb. 20, 2008).
"UDDI Overview", Sep. 6, 2000, pp. 1-21, uddi.org, (http://www.uddi.org/).
"UDDI Technical White Paper," Sep. 6, 2000, pp. 1-12, uddi-org, (http://www.uddi.org/).
"UDDI Version 3.0.1 UDDI", Spec Technical Committee Specification, Oct. 14, 2003, pp. 1-383, uddi.org, (http://www.uddi.org/).
"VERITAS SANPoint Foundation Suite(tm) and SANPoint Foundation Suite(tm) HA: New VERITAS Volume Management and File System Technology for Cluster Environments," Sep. 2001, 26 pages, VERITAS Software Corp.
"Windows Clustering Technologies—An Overview," Nov. 2001, 31 pages, Microsoft Corp., www.microsoft.com, last accessed on Dec. 30, 2002.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Aguilera et al., "Improving recoverability in multi-tier storage systems," International Conference on Dependable Systems and Networks (DSN-2007), Jun. 2007, 10 pages, Edinburgh, Scotland.
Amendment and Response to Office Action filed on Sep. 11, 2009 for U.S. Appl. No. 10/444,279.
Anderson et al., "Interposed Request Routing for Scalable Network Storage," ACM Transactions on Computer Systems 20(1): (Feb. 2002), pp. 1-24.
Anderson et al., "Serverless Network File System," in the 15th Symposium on Operating Systems Principles, Dec. 1995, 49 pages, Association for Computing Machinery, Inc.

(56) References Cited

OTHER PUBLICATIONS

Anonymous, "How DFS Works: Remote File Systems," Distributed File System (DFS) Mar. 2003, 54 pages, Technical Reference retrieved from the Internet on Jan. 29, 2010, URL<http://technetmicrosoft.com/en-us/library/cc782417(WS.10,printer).aspx>.

Anton, Jesse, "Oracle9iAS Web Cache Technical White Paper", Oracle, Jun. 2001, pp. 1-56.

Apple, Inc., "Mac OS X Tiger Keynote Intro. Part 2," Jun. 2004, www.youtube.com <http://www.youtube.com/watch?v=zSBJwEmRJbY>, 1 page.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

Baer, T., et al., "The elements of Web services" ADTmag.com, Dec. 1, 2002, pp. 1-6, (http://www.adtmag.com).

Basney et al., "Credential Wallets: A Classification of Credential Repositories Highlighting MyProxy," Sep. 19-21, 2003, pp. 1-20, $31^{st}$ Research Conference on Communication, Information and Internet Policy (TPRC 2003), Arlington, Virginia.

Blue Coat, "Technology Primer: CIFS Protocol Optimization," Blue Coat Systems Inc., 2007, pp. 1-3, (http://www.bluecoat.com).

Botzum, Keys, "Single Sign On—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the-Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, 22 pages, Technical report No. UCSC-CRL-92-09 of the Computer & Information Sciences Department of University of California at Santa Cruz.

Callaghan et al., "NFS Version 3 Protocol Specifications" (RFC 1813), Jun. 1995, 126 pages, The Internet Engineering Task Force (IETN), www.ietf.org, last accessed on Dec. 30, 2002.

Carlisle, David, "OpenMath, Math ML and XSL", ACM SIGSAM Bulletin, Jun. 2000, vol. 34, Issue 2. pp. 6-11, retrieved from ACM Portal Feb. 21, 2006.

Carns et al., "PVFS: A Parallel File System for Linux Clusters," in Proceedings of the Extreme Linux Track: 4th Annual Linux Showcase and Conference, Oct. 2000, pp. 317- 327, Atlanta, Georgia, USENIX Association.

Cavale, M. R., "Introducing Microsoft Cluster Service (MSCS) in the Windows Server 2003", Nov. 2002, 10 pages, Microsoft Corporation.

Citrix Systems, Inc., "Traffic Surges; Surge Queue; Netscaler Defense," 2005, PowerPoint Presentation, slides 1-12.

Crescendo Networks, "Application Layer Processing (ALP)," 2003-2009, pp. 168-186, Chapter 9, CN-5000E/5500E, Foxit Software Company.

English Translation of Notification of Reason(s) for Refusal for JP 2002-556371 (Dispatch Date: Jan. 22, 2007).

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Big-IP® Reference Guide, version 4.5", F5 Networks Inc., Sep. 2002, pp. 11-1-11-32, Seattle, Washington.

F5 Networks Inc., "Case Information Log for 'Issues with BoNY upgrade to 4.3'", as early as Feb. 2008.

F5 Networks Inc., "Configuration Guide for Local Traffic Management," F5 Networks Inc., Jan. 2006, version 9.2.2, 406 pgs.

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "F5 WANJet CIFS Acceleration", White Paper, F5 Networks Inc., Mar. 2006, pp. 1-5, Seattle, Washington.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

F5 Networks Inc., "Using F5's 3-DNS Controller to Provide High Availability Between Two or More Data Centers", F5 Networks Inc., Aug. 2001, pp. 1-3, Seattle, Washington, (http://www.f5.com/f5products/3dns/relatedMaterials/3DNSRouting.html).

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

Fajardo V., "Open Diameter Software Architecture," Jun. 25, 2004, pp. 1-6, Version 1.0.7, (http://diameter.sourceforge.net/diameter-architecture/indext.html).

Fan et al., "Summary Cache: A Scalable Wide-Area Web Cache Sharing Protocol", Computer Communications Review, Association Machinery, New York, USA, Oct. 1998, pp. 254-265, vol. 28, Web Cache Sharing for Computing No. 4.

Farley, M., "Enterprise Storage Forum," Aug. 6, 2002, 2 pages, Book Review—Building Storage Networks, $2^{nd}$ Edition, http://www.enterprisestorageforum.com/sans/features/print/0,,10556_1441201.00.html, Enterprise Storage Forum Staff, last accessed Dec. 20, 2002.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.

Gibson et al., "NASD Scalable Storage Systems," Jun. 1999, 6 pages, USENIX99, Extreme Linux Workshop, Monterey, California.

Gupta et al., "Algorithms for Packet Classification", Computer Systems Laboratory, Stanford University, CA, Mar./Apr. 2001, pp. 1-29.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Heinz G., "Priorities in Stream Transmission Control Protocol (SCTP) Multistreaming", Thesis submitted to the Faculty of the University of Delaware, Spring 2003, pp. 1-35.

Hochmuth, Phil, "F5, CacheFlow pump up content-delivery lines," Network World Fusion, May 4, 2001, 1 page, Las Vegas, Nevada.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single I/O Space," IEEE Concurrency, Jan.-Mar. 1999, pp. 60-69.

IBM Corporation, "A Process for Selective Routing of Servlet Content to Transcoding Modules," Research Disclosure 422124, Jun. 1999, pp. 889-890.

IBM Corporation, "Servlet/Applet/HTML Authentication Process With Single Sign-On," Research Disclosure 429128, Jan. 2000, pp. 163-164.

(56) References Cited

OTHER PUBLICATIONS

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Inoue et al, "Resource Allocation Schemes for Non-Real-Time Bursty Traffic in Wireless ATM Networks", Global Telecommunications Conference 1996, Nov. 18-22, 1996, vol. 3, pp. 1984-1990.
International Search Report and Written Opinion, for International Patent Application No. PCT/US2011/058469, dated May 30, 2012.
International Search Report for International Patent Application No. PCT/US2008/083117 (dated Jun. 23, 2009).
International Search Report for International Patent Application No. PCT/US2008/060449 (dated Sep. 4, 2008).
International Search Report for International Patent Application No. PCT/US2008/064677 (dated Jun. 9, 2009).
International Search Report for International Patent Application No. PCT /US02/00720, dated Mar. 19, 2003.
International Search Report and Written Opinion for International Patent Application No. PCT/US2013/026615 (dated Jul. 4, 2013).
International Search Report from International Application No. PCT/US03/41202, dated Sep. 15, 2005.
Internet Protocol,"DARPA Internet Program Protocol Specification", (RFC:791), Information Sciences Institute, University of Southern California, Sep. 1981, pp. 1-49.
Karamanolis, C. et al., "An Architecture for Scalable and Manageable File Services," HPL-2001-173, Jul. 26, 2001. pp. 1-14.
Katsurashima, W. et al., "NAS Switch: A Novel CIFS Server Virtualization," Proceedings 20th IEEE/11th NASA Goddard Conference on Mass Storage Systems and Technologies, 2003 (MSST 2003), Apr. 2003.
Kawamoto, D., "Amazon files for Web services patent", CNET News.com, Jul. 28, 2005, pp. 1-2, (http://news.com).
Kimball, C.E. et al., "Automated Client-Side Integration of Distributed Application Servers," 13Th LISA Conf., 1999, pp. 275-282 of the Proceedings.
Klayman, J., Response filed by Japanese associate to office action dated Jan. 22, 2007 in corresponding Japanese patent application No. 2002-556371.
Klayman, J., Nov. 13, 2008 e-mail to Japanese associate including instructions for response to office action dated May 26, 2008 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)," RFC 1510, Sep. 1993, 105 pages, http://www.ietf.org/ rfc/rfc1510.txt?number=1510.
Korkuzas, V., Communication pursuant to Article 96(2) EPC dated Nov. 9, 2007 in corresponding European patent application No. 02718824.2-2201, 3 pages.
LaMonica M., "Infravio spiffs up Web services registry idea", CNET News.com, May 11, 2004, pp. 1-2, (http://www.news.com).
Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.
Long et al., "Swift/RAID: A distributed Raid System", Computing Systems, Summer 1994, 20 pages, vol. 7.
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
Microsoft Corporation, "Windows Server 2003 Kerberos Extensions," Microsoft TechNet, 2003 (Updated Jul. 31, 2004), http://technet.microsoft.com/en-us/library/cc738207.
Modiano E., "Scheduling Algorithms for Message Transmission Over a Satellite Broadcast System", MIT Lincoln Laboratory Advanced Networks Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.
Norton et al., "CIFS Protocol Version CIFS-Spec 0.9," 2001, 125 pages, Storage Networking Industry Association (SNIA), www.snia.org, last accessed on Mar. 26, 2001.
Novotny et al., "An Online Credential Repository for the Grid: MyProxy," 2001, pp. 1-8.
Ott D., et al., "A Mechanism for TCP-Friendly Transport-level Protocol Coordination", USENIX Annual Technical Conference, 2002, University of North Carolina at Chapel Hill, pp. 1-12.
Owasp, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, 1996, pp. 1-15.
Pashalidis et al., "A Taxonomy of Single Sign-On Systems," 2003, pp. 1-16, Royal Holloway, University of London, Egham Surray, TW20, 0EX, United Kingdom.
Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004, 5 pages, Royal Holloway, University of London.
Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc., www.acm.org, last accessed on Dec. 20, 2002.
Pearson, P.K., "Fast Hashing of Variable-Length Text Strings," Comm. of the ACM, Jun. 1990, pp. 677-680, vol. 33, No. 6.
Peterson, M., "Introducing Storage Area Networks," Feb. 1998, 6 pages, InfoStor, www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.
Response filed Jul. 6, 2007 to Office action dated Feb. 6, 2007 for related U.S. Appl. No. 10/336,784, 24 pages.
Response filed Mar. 20, 2008 to Final Office action dated Sep. 21, 2007 for related U.S. Appl. No. 10/336,784, 22 pages.
Robot Wars—How Botnets Work, http://www.windowsecurity.com/articles/Robot-Wars-How-Botnets-Work.html, launched Oct. 20, 2005 (accessed Dec. 15, 2006), 10 pgs.
Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.
Rosen E., et al., "MPLS Label Stack Encoding", (RFC:3032) Network Working Group, Jan. 2001, pp. 1-22,(http://www.ietf.org/rfc/rfc3032.txt).
RSYNC, "Welcome to the RSYNC Web Pages," Retrieved from the Internet URL: http://samba.anu.edu.ut.rsync/. (Retrieved on Dec. 18, 2009), 5 pages.
Savage, et al., "AFRAID—A Frequently Redundant Array of Independent Disks," Jan. 22-26, 1996, pp. 1-13, USENIX Technical Conference, San Diego, California.
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).

(56) References Cited

OTHER PUBLICATIONS

Seeley R., "Can Infravio technology revive UDDI?", ADTmag.com, Oct. 22, 2003, (http://www.adtmag.com).
Shohoud, Y., "Building XML Web Services with VB .NET and VB 6", Addison Wesley, 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002, Penn Well Corporation.
Suzuki et al, "Managing the Software Design Documents With XML", Proceedings of the 16$^{th}$ Annual International Conference on Computer Docum, Sep. 1998, pp. 127-136, ACM Portal Feb. 21, 2006.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Uesugi, H., Jul. 15, 2008 letter from Japanese associate reporting office action dated May 26, 2008 in corresponding Japanese patent application No. 2002-556371, 2 pages.
Wang B., "Priority and realtime data transfer over the best-effort Internet", Dissertation Abstract, 2005, ScholarWorks@UMASS.
Weiss, Aaron, "XML Gets Down to Business", Mixed Media, Sep. 1999, vol. 3, Issue 3, pp. 36-43.
White Paper: Application Firewalls, F5 Networks, Inc. Copyrighted Oct. 2007, 7 pgs.
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, 29 pages, vol. 14, No. 1, ACM Transactions on Computer Systems.
Williams et al., "The Ultimate Windows Server 2003 System Administrator's Guide: Forwarding Authentication," 2003, 2 pages, Figure 10.7, Addison-Wesley Professional, Boston, Massachusetts.
Woo T.Y.C., "A Modular Approach to Packet Classification: Algorithms and Results", Bell Laboratories, Lucent Technologies, Mar. 2000, pp. 1-10.
Zayas, E., "AFS-3 Programmer's Reference: Architectural Overview," Sep. 2, 1991, 37 pages, Version 1.0 (doc. No. FS-00-D160) Transarc Corporation.
Box et al., "Simple Object Access Protocol (SOAP) 1.1," W3C Note, pp. 1-34, May 8, 2000.
Levy, Ken, "New XML Tools in Visual Studio 2005," Ken Levy's Blog, MSDN Blogs, 1 page, Jul. 21, 2004.
F5 Networks, Inc., "Application Firewalls," White Paper, pp. 1-7, Oct. 2007.
F5 Networks, Inc., "Optimize WAN and LAN Application Performance with TCP Express," White Paper, pp. 1-7, Aug. 2007.
Big;IP Link Controller, "Take Control of Multiple ISP Connections," Datasheet, F5 Networks, Inc., pp. 1-4, 2013.
Big-IP Local Traffic Manager, "Application Delivery with Programmable Infrastructure," Datasheet, F5 Networks, Inc., pp. 1-8, 2014.
Big-IP® Local Traffic Manager™: Implementations, Version 12.1, MAN-0293-13, F5 Networks, Inc., pp. 1-228, May 4, 2018.
Big-IP® Local Traffic Manager™: Implementations, Version 12.1, MAN-0293-13, pp. 1-232, May 24, 2016.

* cited by examiner

METHODS AND SYSTEM FOR RETURNING REQUESTS WITH JAVASCRIPT FOR CLIENTS BEFORE PASSING A REQUEST TO A SERVER

TECHNOLOGICAL FIELD

The technology generally relates to network communication security, and more particularly, to identifying and thwarting network attacks, such as DoS and DDoS attacks.

CROSS-REFERENCE TO RELATED APPLICATIONS

This application is related to commonly owned U.S. patent application Ser. No. 12/357,372, entitled "Thwarting Drone-Waged Denial of Service Attacks on a Network," filed on Jan. 21, 2009 by Khanal; commonly owned U.S. patent application Ser. No. 12/018,031, entitled "DNS Flood Protection Platform For A Network," filed on Jan. 22, 2008 by Thornewell et al.; and commonly owned U.S. patent application Ser. No. 10/444,279, entitled "System And Method For Managing Traffic To A Probe," filed on May 23, 2003 by Masters et al., the entire disclosures of which are incorporated herein by reference in their entirety.

BACKGROUND

With the widespread use of Web based applications and the Internet in general, concerns have been raised with the availability of servers in view of malicious attacks from client devices requesting access to servers. Such attacks may include brute force attempts to access the server or so-called denial of service attacks. A denial-of-service attack (DoS attack) and distributed denial-of-service attack (DDoS attack) are attempts to make a computer server unavailable to its intended users. A denial of service attack is generally a concerted, malevolent effort to prevent an Internet site or service from functioning.

DoS and DDoS attacks typically target sites or services hosted on high-profile Web servers such as banks, credit card payment gateways and root servers. One common method of attack involves saturating the target machine with external communication connection requests such that it cannot respond to legitimate traffic, or responds so slowly as to be rendered effectively unavailable. In general terms, DoS attacks are implemented by forcing the targeted server computer to reset or consume its resources to the point of interrupting communications between the intended users and servers.

Denial of service attacks and brute force attacks depend on client devices mimicking legitimate requests to tie up server resources. In order to prevent such attacks, network firewalls may be used to intercept traffic to a networked server and attempt to filter out malicious packets. Unfortunately, many current firewalls typically cannot distinguish between legitimate requests that are originated by legitimate users and transactions that are originated by attackers.

SUMMARY

According to one example, a method for protecting a server from network based attacks from a client device requesting access to the server is disclosed. A request to access the server is received. The request is returned to the client device with a client side language script to be executed by the requesting client device. A returned request is received at the server indicating execution of the client side language script by the client device. The returned request is allowed to be processed by the server.

According to another example, a machine readable medium having stored thereon instructions for applying a client side language script to server requests for access to a server is disclosed. The machine readable medium includes machine executable code which when executed by at least one machine, causes the machine to receive a request from a client device to access a server based application. The code causes the machine to return the request to the client device with a client side language script to be executed by the client device. The code causes the machine to receive a returned request indicating execution of the client side language script by the client device. The code causes the machine to send the returned request to the server.

Another example disclosed is a network traffic device for protection against attacks from a client device requesting access to a server. The network traffic device includes a server interface coupled to the server. A network interface is coupled to the client device via a network. The network interface receives a request from the client device requesting access to the server. A controller is coupled to the server interface and the network interface. The controller is operative to return the request to the client device with a client side language script to be executed by the client device. The network interface receives a returned request indicating execution of the client side language script and the controller sends the returned request to the server.

Additional aspects will be apparent to those of ordinary skill in the art in view of the detailed description of various embodiments, which is made with reference to the drawings, a brief description of which is provided below.

Figure 1:
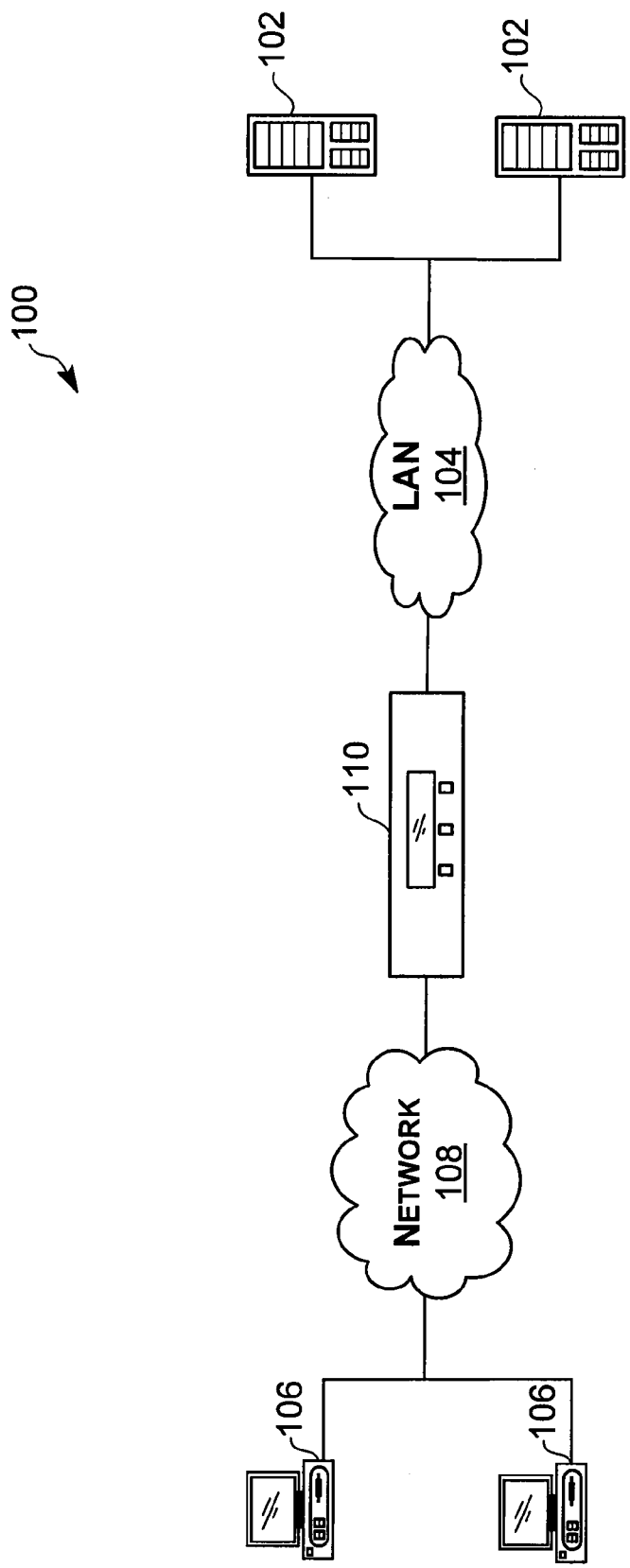
FIG. 1 is a diagram of an example system environment that includes a network traffic management device configured to identify and diffuse network attacks.

While these examples are susceptible to illustration in many different forms, there is shown in the drawings and will herein be described in detail several examples with the understanding that the present disclosure is to be considered as an exemplification and is not intended to limit the broad aspect to the illustrated examples.

DETAILED DESCRIPTION

Currently, network attacks, such as denial of service (DoS) and distributed denial of service (DDoS) attacks, are levied against network resources, such as applications running on targeted servers, server machines themselves, or particular Web page resources targeted on servers. The attacks generally involve saturating servers with artificial or illegitimate requests for the targeted resource using automated applications, such as Botnets, to essentially tie up the server resources and render the target unavailable to its intended users, such as legitimate requesting clients. Thus, these types of attacks focus on placing a burden on the server rather than the client devices originating the attacks. Some network attack prevention solutions mitigate these attacks using techniques employed at Layer 4 of the OSI layer, but these solutions are not application aware and thus are not able to more precisely detect such attacks. Such solutions also require server resources to process requests to a server and therefore do not thwart large scale attacks, such as DoS attacks.

Referring now to FIG. 1, an example system environment 100 employs a network traffic management device 110 that is capable of identifying and thwarting or diffusing these types of network attacks in an effective manner. The example system environment 100 includes one or more Web application servers 102, one or more client devices 106 and the traffic management device 110, although the environment 100 could include other numbers and types of devices in other arrangements. The traffic management device 110 is coupled to the web application servers 102 via local area network (LAN) 104 and client devices 106 via network 108. Generally, requests sent over the network 108 from client devices 106 towards Web application servers 102 are received by traffic management device 110. Before the network traffic management device 110 forwards requests to the appropriate Web application servers 102, the device 110 identifies potential attacks and forwards legitimate requests to the servers 102, as will be described in further detail below in connection with FIGS. 3-4.

Client devices 106 comprise computing devices capable of connecting to other computing devices, such as network traffic management device 110 and Web application servers 102, over wired and/or wireless networks, such as network 108, to send and receive data, such as for Web-based requests, receiving responses to requests and/or for performing other tasks in accordance with the processes described below in connection with FIGS. 3-4, for example. Non-limiting and non-exhausting examples of such devices include personal computers (e.g., desktops, laptops), mobile and/or smart phones and the like. In this example, client devices 106 run Web browsers that may provide an interface for operators, such as human users, to interact with for making requests for resources to different web server-based applications or Web pages via the network 108, although other server resources may be requested by clients. One or more Web-based applications may run on the Web application server 102 that provide the requested data back to one or more exterior network devices, such as client devices 106.

Network 108 comprises a publicly accessible network, such as the Internet in this example, which includes client devices 106, although the network 108 may comprise other types of private and public networks that include other devices. Communications, such as requests from clients 106 and responses from servers 102, take place over the network 108 according to standard network protocols, such as the HTTP and TCP/IP protocols in this example, but the principles discussed herein are not limited to this example and can include other protocols. Further, it should be appreciated that network 108 may include local area networks (LANs), wide area networks (WANs), direct connections and any combination thereof, and other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication medium and method by which data may travel between client devices 106, Web application servers 102 and network traffic management device 110, and these examples are provided by way of example only.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108, and thus will not be described further here.

Web application server 102 comprises one or more server computing machines capable of operating one or more Web-based applications that may be accessed by network devices in the network 108, such as client devices 106, via the network traffic management device 110, and may provide other data representing requested resources, such as particular Web page(s), image(s) of physical objects, and any other objects, responsive to the requests, although the server 102 may perform other tasks and provide other types of resources. It should be noted that while only two Web application servers 102 are shown in the environment 100 depicted in FIG. 1, other numbers and types of servers may be coupled to the network traffic management device 110. It is also contemplated that one or more of the Web application servers 102 may be a cluster of servers managed by the network traffic management device 110.

As per the TCP/IP protocols, requests from the requesting client devices 106 may be sent as one or more streams of data packets over network 108 to the traffic management device 110 and/or the Web application servers 102 to establish connections, send and receive data for existing connections, and for other purposes. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Each of the Web application servers 102 and client devices 106 may include one or more central processing units (CPUs), one or more computer readable media (i.e., memory), and interface systems that are coupled together by internal buses or other links as are generally known to those of ordinary skill in the art; as such, they will not be described further here.

As shown in the example environment 100 depicted in FIG. 1, the network traffic management device 110 is interposed between client devices 106 in network 108 and Web application servers 102 in LAN 104. Again, the environment 100 could be arranged in other manners with other numbers and types of devices. Also, the network traffic management device 110 is coupled to network 108 by one or more network communication links and intermediate network devices, such as routers, switches, gateways, hubs and other devices (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the Web application servers 102 in LAN 104 in these examples. These requests may be destined for one or more servers 102, and, as alluded to earlier, may take the form of one or more TCP/IP data packets originating from the network 108, passing through one or more intermediate network devices and/or intermediate networks, until ultimately reaching the traffic management device 110, for example. In any case, the network traffic management device 110 may manage the network communications by performing several network traffic related functions involving the communications, such as load balancing, access control, and validating HTTP requests using JavaScript code sent back to requesting client devices 106 in accordance with the processes described further below in connection with FIGS. 3-4, for example.

Figure 2:
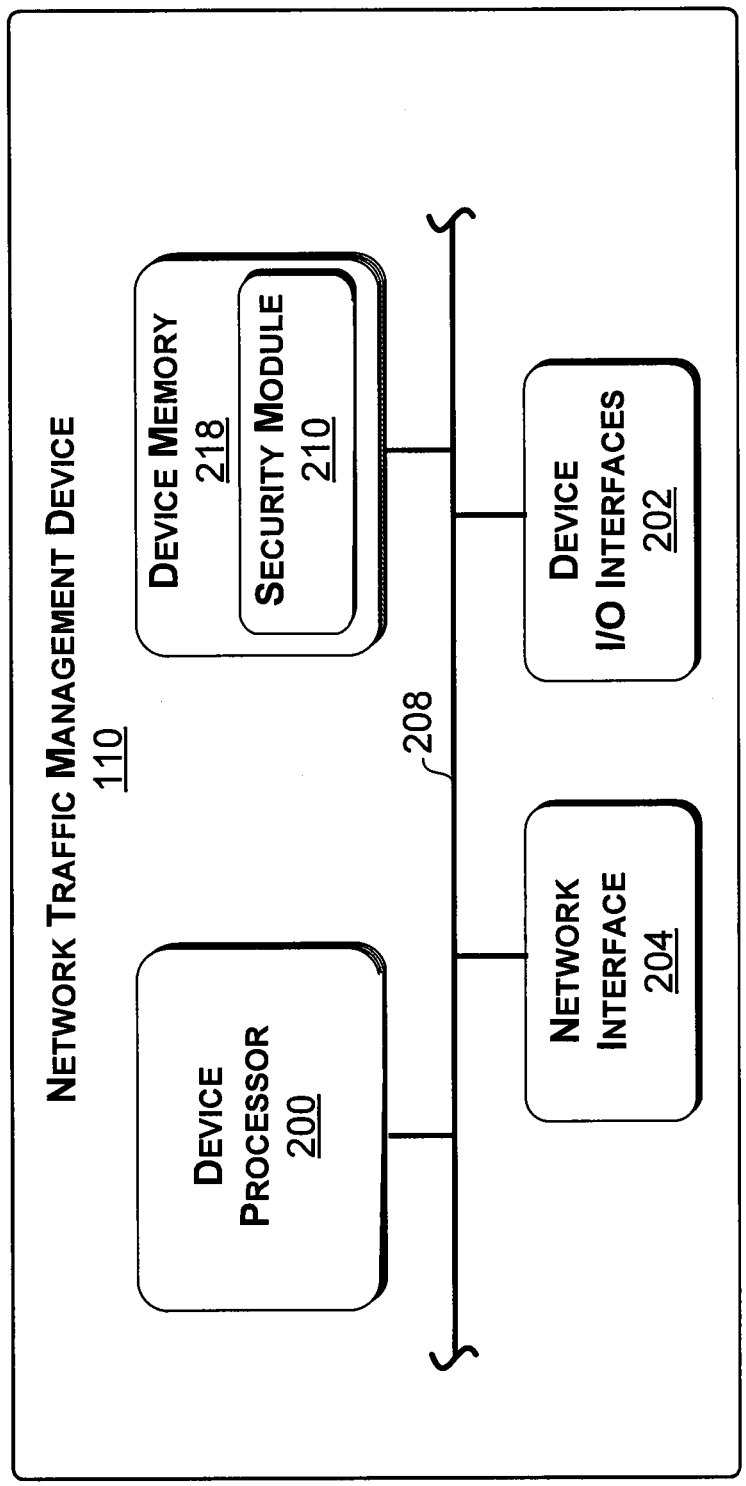
FIG. 2 is a block diagram of the network traffic management device shown in FIG. 1.

Referring now to FIG. 2, an example network traffic management device 110 includes a device processor 200, device I/O interfaces 202, network interface 204 and device memory 218, which are coupled together by bus 208, although the device 110 could include other types and numbers of components.

Figure 3:
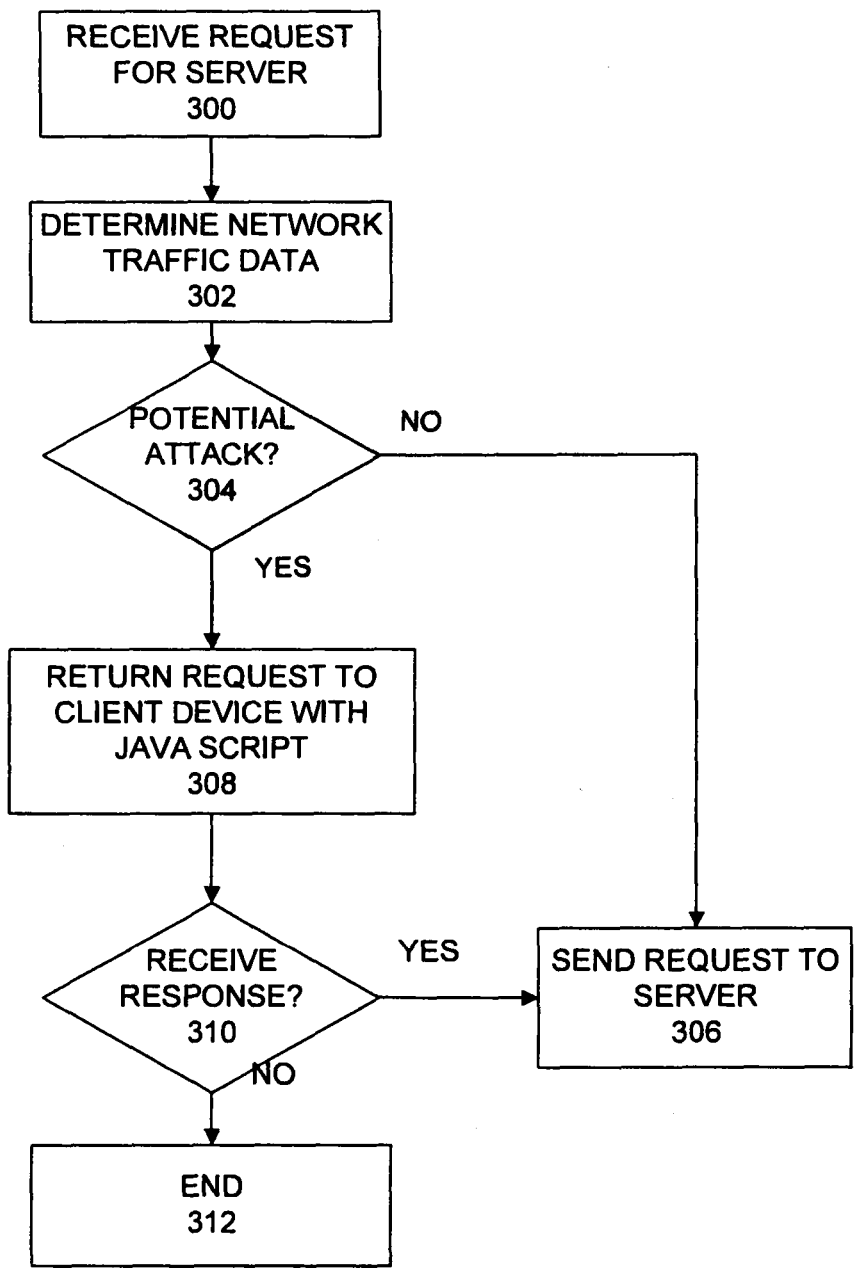
FIGS. 3-4 are examples of flow chart diagrams depicting portions of processes for identifying and diffusing network attacks.
Figure 4:
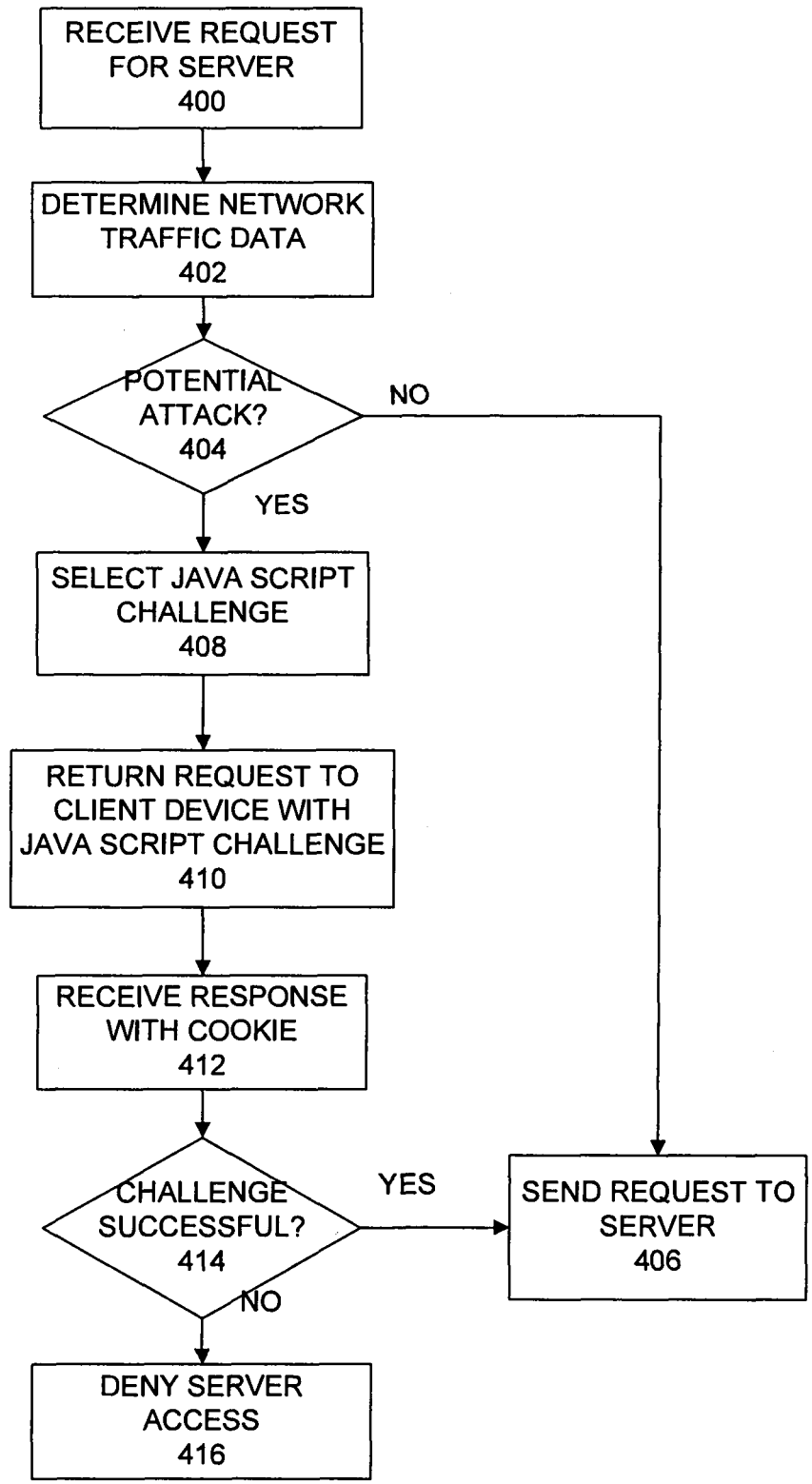

Device processor 200 comprises one or more microprocessors configured to execute computer/machine readable and executable instructions stored in device memory 218 to implement network traffic management related functions of the network traffic management device 110 in addition to implementing security module 210 to perform one or more portions of the processes illustrated in FIGS. 3-4 for protecting servers against denial of service attacks, although processor 200 may comprise other types and/or combinations of processors, such as digital signal processors, microcontrollers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein with respect to FIGS. 3-4.

Device I/O interfaces 202 comprise one or more user input and output device interface mechanisms, such as a computer keyboard, mouse, display device, and the corresponding physical ports and underlying supporting hardware and software to enable the network traffic management device 110 to communicate with the outside environment for accepting user data input and to provide user output, although other types and numbers of user input and output devices may be used. Alternatively or in addition, as will be described in connection with network interface 204 below, the network traffic management device 110 may communicate with the outside environment for certain types of operations (e.g., configuration) via a network management port, for example.

Network interface 204 comprises one or more mechanisms that enable network traffic management device 110 to engage in TCP/IP communications over LAN 104 and network 108, although the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108 in this example; and where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as Web application servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters, which enable the various components of the network traffic management device 110, such as the processor 200, device I/O interfaces 202, network interface 204, and device memory 218, to communicate, although the bus may enable one or more components of the network traffic management device 110 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses may be used and the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by one or more processors, such as device processor 200, to perform actions, including implementing an operating system for controlling the general operation of network traffic management device 110 to manage network traffic and implementing security module 210 to perform one or more portions of the processes illustrated in FIGS. 3-4 for protecting servers against DoS attacks, for example, although some or all of the programmed instructions could be stored and/or executed elsewhere, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing or specially programmed device, such as network traffic management device 110. When the instructions stored in device memory 218 are run by the device processor 200, the network traffic management device 110 implements the security module 210 and performs at least a portion of the processes in FIGS. 3-4 and the various network traffic management related functions, including firewall functions, server load balancing functions, device configuration functions (e.g., defining network security policies), and other functions.

Security module 210 is depicted in FIG. 2 as being within memory 218 for exemplary purposes only; it should be appreciated the module 210 may be alternatively located elsewhere. Generally, when instructions embodying the security module 210 are executed by the device processor 200, the network traffic management device 110 identifies and diffuses potential or suspected network attacks on the server 102 by placing additional burdens on the suspected attacking client devices 106. The security module 210 identifies network communications that may include network attacks, or at least suspected network attacks, using information obtained by the security module 210 to analyze collected data regarding particular clients, such as client devices 106, client requests destined for particular servers, such as the server 102, or particular resources made available by particular servers that have been requested, for example.

The security module 210 also uses additional information obtained by further analyzing collected data to identify latencies associated with particular servers, server applications or other server resources, page traversal rates, client device fingerprints and access statistics that the security module 210 may analyze to identify anomalies indicative to the module 210 that there may be an attack. The security module 210 also analyzes collected data to obtain information the security module 210 may use to identify particular servers and/or server applications and resources on particular servers, such as Web application server 102, being targeted in network attacks, so the module 210 can handle the attack in the manner described in greater detail herein below in connection with FIGS. 3-4.

Upon identifying suspected network attacks, the security module 210 may initially prevent the associated requests from reaching the server 102 so the security module 210 may determine whether a request is indeed a network attack or is a legitimate request. Instead of forwarding the request on to the potential target of an attack (e.g., server device 102), the security module 210 sends a "modified" response back to the potential attacker on behalf of the potential target. The response is "modified" because it does not embody the object or resource itself that is being requested, and that may be the object of the attack itself, but includes information representing instructions (e.g., JavaScript code) to be executed by the potential attacker to perform a challenge, which may or may not yield an expected result, to generate an HTTP cookie for storing any result(s) obtained by performing any such challenges or other information, and to recreate and resend its initial request including any cookies storing challenge results. Further, the challenge comprises Javascript code to be executed by the potential attacker, although other types of challenges could be employed and the code could be expressed in other programming, markup or script languages. Finally, the module 210 responds to the potential attacker with the modified response on behalf of the potentially targeted server (e.g., server device 102) unbeknownst to the attacker. The attacker, however, receives what it would otherwise understand to be a response to its initial request.

If the potential attacker is indeed an actual attacker conducting an automated attack, then the attacker may not execute the challenge (e.g., JavaScript code) included in the modified response received back from the security module 210, or the attacker may execute the challenge but not generate the correct result, and the security module 210 determines it is a confirmed attack and will prevent the target of the attack (e.g., server 102) from being subjected to the request and expending its resources in responding to it.

If the potential attacker is indeed a legitimate requestor and not mounting an attack, it will execute the challenge (e.g., JavaScript code) included in the modified request, which will cause it to resend its initial request and include any results obtained by executing the challenge in a cookie (hereinafter referred to as a "reconstituted request"), although other fingerprints or information that the module 210 will be able to analyze to determine that the associated requestor is legitimate may be used.

Once the security module 210 receives the reconstituted request, it confirms whether any included challenge results are correct and determines whether the potential attacker is indeed a legitimate requestor. It then forwards the request on to the destined server, such as the server 102 in this example. In this manner, legitimate requests are serviced properly without interruption. Additionally, the rate at which requests are forwarded to the server 102 is slowed when requesting client devices 106 process the challenges (e.g., JavaScript) included in the modified responses by the security module 210 prior to resending the modified requests, therefore thwarting denial of service attacks. The attacks may be further slowed if the challenges are signed, since this would force the requestors to calculate the signature. In such a case, the challenge cannot be copied or reverse engineered by the client device 106. The calculation of such a challenge allows a legitimate requestor to access server resources without any interference while attackers are either filtered out or slowed down significantly. The security module 210 therefore gains some control over the rate of requests to the server 102, which provides additional, unexpected utility beyond network security in that it is also useful for enhancing server load balancing.

An alternate procedure may involve the security module 210 returning the request with a string of client side code, such as JavaScript coding, requiring a computational task to be performed by the requesting client device. It is to be understood that other client side languages, such as FLASH, Silverlight, VB script, etc., may be returned with the request. In this example, the JavaScript code may include an onLoad function that would cause the executing client device to execute a test or challenge that authenticates the code in order to increase confidence that the code is proper. The client device 106 receiving the challenge then computes the challenge in the code. The client device 106 may then create a cookie with the results of the challenge and submit a response with the cookie. In this process, the JavaScript may hijack the client device using a command such as onLoad that accesses the client side symbol table. The request may be parsed by the security module 210 and the JavaScript code is injected, which will wrap string related functions/methods with closures such that when those will be called their string arguments will be logged to a data structure which be synchronized back to the server side by Ajax or using a request that serializes the data structure and adds it as a header to the next request made to the server 102.

On receiving the returned request from the network traffic management device 110, the client device 102 may perform the instructions in the embedded JavaScript code if the client device is a legitimate requestor that can execute JavaScript code. Many client devices that may perform attacks, such as denial of service or brute force attacks, may not be capable of processing the JavaScript in the request and therefore will not send a response to the network device 110. Thus, client devices that do not support JavaScript or have JavaScript disabled may have nefarious purposes or intentions, and may not be served by the application server 102. Other client devices that may be attackers will not process the script and therefore not return the correct answer to the challenge. Therefore, the client devices that cannot perform the client side code functionality sent by the security module 210 will not be served by the Web application server 102.

The computational task may include any type of challenge that when executed produces a result that may be checked and confirmed or validated against an expected result. Such computational challenges may include calculating the summation of a string of values, a reverse hash or any other calculations or operations. Further, the computational challenge may include calculations involving multiple iterations to calculate an expected result, although again, different types of challenges may be used. The length, complexity, and type of the challenged calculation is determined by the security module 210 based on one or more configuration settings applied to the network traffic management device 110, and may be adjusted for other enhancing or optimizing other network related functions, such as sever load balancing, for example.

Challenge insertion could be turned on and off for specific server resources, such as Virtual IPs or particular URIs, either manually or automatically according to load balancing policies the network traffic management device 110 may be configured to implement. In this example, the client device 106 is issued a cookie via the injected JavaScript that provides time-limited credentials and is redirected to their original destination.

Once the reconstituted response is returned back to the network traffic management device 110 by the client device 106, the security module 210 may receive the request with a result from the computational task. The security module 210 may then forward the request on to the server 102, effectively allowing the request to be processed by the server 102 upon receiving the request with the result. The security module 210 may also check the result to determine whether the execution of the JavaScript by the client device 106 was performed correctly therefore indicating a legitimate request. In this manner, attacks may be denied because the client device 106 requesting access to the server 102 is forced to perform other computational tasks without taking server computing resources. The delay in processing potential attacks allows the security module 210 to gain control over the rate of the requests from these clients that are processed by the server 102. Further, the computational challenge may obtain information about the user or the user agent of the client device that may be used for identification, validation or personalization. The process may be used to defend the firewall application itself from denial of service attacks directed toward the firewall application.

As noted above, the implementation of the challenge may be executed depending on the security module 210 identifying a potential attack on the server 102. The security module 210 may also measure the delay time of server responses (i.e., latency), and send different challenges in the form of the JavaScript depending on the delay time. For example, if there is a large amount of load on the server (e.g., based on some predefined metric, arbitrary threshold or some selected load value), the security module 210 may distribute the challenges in order to distribute the load of returned responses over non-peak times from server requests, for example.

The security module 210 may allow JavaScript analysis in constructing a security policy by avoiding the server 102 statically analyzing JavaScript. The security module 210 may hijack JavaScript execution events on the client side such as a client device 106 in FIG. 1 and traverse the symbol table so that all executions producing useful policy entities can log these potential policy entities for later sending these extracted policy entities back to the server 102 for security policy purposes. Alternatively, the injected JavaScript code added to the response from the client device 106 may cause the client device to send the absent but required context information from the JavaScript code back to the server 102. This may allow the server 102 to perform more exact JavaScript processing using existing tools. This may also allow processing of the JavaScript code on the server 102 which may reduce risk on exposing JavaScript processing knowledge/needs to curious client devices.

The JavaScript code injected on the request by the security module 210 will hijack events similarly to the client processing but will use them to serialize the client side context. Then this serialization is sent back to the server side where the processing on the JavaScript code (which is part of the client context) is performed by the client device. This solution facilitates not exposing how and what is done with the JavaScript code, which is something that will be exposed in the client side solution. Alternatively a JavaScript enabled browser may be used on the network device 110 that will execute the JavaScript code and extract the required policy entities (without actually sending anything anywhere).

Although an example of the Web application server 102, network traffic device 110, and client devices 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

In addition, two or more computing systems or devices may be substituted for any one of the devices in the example system environment 100. Accordingly, principles and advantages of distributed processing, such as redundancy, replication, and the like, also can be implemented, as desired, to increase the robustness and performance of the devices in the example system environment 100. The example system environment 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

The operation of the example use of JavaScript for a security policy is shown in FIG. 3 which may be run on the example network traffic device 110, will now be described with reference to FIGS. 1-2 in conjunction with the flow diagram shown in FIG. 3. FIG. 3 is a flow diagram of the process that allows protection of the server 102 from attacks which may occupy server resources such as denial of service or brute force attacks from a networked client device such as the client device 106 in FIG. 1. The network traffic management device 110 may receive a request for access to the server 102 from a client device such as the client device 106 in FIG. 1 over the network 108 (300). The network traffic management device 110 determines whether there is unusually heavy traffic requesting the server or analyzes traffic using other metrics (302). The network traffic management device 110 then determines whether the analysis evidences a possible undergoing attack to tie up server resources such as a denial of service attack (304). If the traffic is within normal parameters, the network traffic management device 110 will not detect a mass attack and will allow the request access to the server (306).

If the traffic data indicates that there is a possible attack, the network traffic management device 110 returns the request to the sending client device embedded JavaScript code in the response (308). After the client device receives the response, it must execute the JavaScript code to resend the request. The network traffic appliance determines whether the resent request is received after the client device executing the JavaScript code (310). If the response is received, the network traffic management device 110 may send the request to the server 102 (306). If no response is received, the network traffic management device 110 ends the routine without requesting access to the server 102 (312). The delay of access to the server as well as the JavaScript slow down malicious requests to the server and therefore thwarts overload attacks such as a denial of server attack.

The operation of the example use of a JavaScript challenge in a request sent back to a client device is shown in FIG. 4, which may be run on the example network traffic device 110, will now be described with reference to FIGS. 1-2 in conjunction with the flow diagram shown in FIG. 4. FIG. 4 is a flow diagram of the process that allows protection of the server 102 from attacks which may occupy server resources such as denial of service or brute force attacks from a networked client device such as the client device 106 in FIG. 1. The network traffic management device 110 may receive a request for access to the server 102 from a client device such as the client device 106 in FIG. 1 over the network 108 (400). The network traffic management device 110 determines whether there is unusually heavy traffic requesting the server or analyzes traffic using other metrics (402). The network traffic management device 110 then determines whether the analysis evidences a possible undergoing attack to tie up server resources such as a denial of service attack (404). If the traffic is within normal parameters, the network traffic management device 110 will not detect a mass attack and will allow the request access to the server (406).

If the traffic data indicates that there is a possible attack, the network traffic management device 110 selects a JavaScript challenge code (408). The selection may be made by simply selecting a default challenge code. Alternatively, the challenge may be selected based on the variable length of the solution if it is desired to balance the load to the server 102. The network traffic management device 110 then returns the request to the sending client device with the embedded JavaScript code challenge in the response (410). In this example, the code challenge may include a command for client device to automatically execute the challenge. The execution of the challenge results in a cookie being included in a response to the network traffic management device 110. The response with the cookie is received by the network traffic management device 110 (412). As noted above, if no response is received, the request is never passed to the server 102 and therefore attacks may be thwarted if the client device is not Java enabled.

Once the response is received, the network traffic management device 110 may compare the data in the cookie (the result of the computational challenge) with the expected results of the computational challenge to determine if the result is correct (414). If the result is correct, the request is sent to the server 102. If the result of the executed challenge code is not correct, the network traffic management device 110 denies the request access to the server 102 (416). The delay of access to the server as well as the computational challenge slow down malicious requests to the server and therefore thwarts overload attacks such as a denial of server attack.

It should be appreciated that one or more of the above-described components of the example network traffic management device 110 could be implemented by software, hardware, firmware, and combinations thereof. Also, some or all of the machine/computer readable and executable instructions, example portions of which are represented by the security module 210 in FIG. 2 and the flowcharts in FIGS. 3-4, may be implemented in cooperation with one or more devices and/or processors in other devices. Further, although the example processes are described with reference to the the security module 210 in FIG. 2 and the flowcharts in FIGS. 3-4, persons of ordinary skill in the computer, software and/or networking arts will readily appreciate that many other alternative methods of implementing the example machine readable and executable instructions may be used. For example, the order of execution of the process blocks may be changed, and/or some of the blocks described may be changed, eliminated and/or combined.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for mitigating network based attacks, implemented by a network traffic management system comprising one or more network traffic management apparatuses, client devices, or server devices, the method comprising:

determining when a server is operating outside a range of expected parameters based on one or more server-side metrics, and when the determination indicates that the server is operating outside the range of expected parameters:

responding to one or more of a plurality of clients, from which a plurality of requests for resources hosted by the server have been received, with a response containing a client side language script having a computational challenge but that does not include a requested resource, wherein execution of the client side language script by the one or more of the clients causes the one or more of the clients to generate a client side execution result that is included with one or more subsequent requests from the one or more of the clients related to the requested resources, sending the one or more subsequent requests for the resources to the server when the client side execution result included therein is determined to be correct based on a comparison of the client side execution result to one or more expected values, receiving one or more responses containing the requested resources from the server, and providing the requested resources back to the requesting one or more of the clients.

2. The method as set forth in claim 1, wherein the client side execution result is included in an HTTP cookie that is sent with the one or more subsequent requests from the one or more of the clients or in any header within the one or more subsequent requests.

3. The method as set forth in claim 1, further comprising dropping another one or more subsequent requests from the one or more of the clients that contain an incorrect client side execution result or upon not receiving any subsequent requests from the one or more of the clients when the determination indicates that the server is operating outside the range of expected parameters.

4. The method as set forth in claim 1, further comprising selecting the client side language script from among a plurality of client side language scripts for including in the response to the one or more of the clients based on a variable length of script execution time and a determined latency of a plurality of responses received from the server.

5. The method as set forth in claim 1, further comprising determining that a potential network attack is taking place based on one or more of:
   a determination that the server is operating outside the range of expected parameters; or
   collected data regarding particular clients, client requests, requested resources, particular servers, server applications, or server resources, wherein the collected data comprises latencies, page traversal rates, fingerprints, or access statistics.

6. A network traffic management apparatus, comprising memory comprising programmed instructions stored thereon and one or more processors configured to be capable of executing the stored programmed instructions to:
   determine when a server is operating outside a range of expected parameters based on one or more server-side metrics, and when the determination indicates that the server is operating outside the range of expected parameters:
      respond to one or more of a plurality of clients, from which a plurality of requests for resources hosted by the server have been received, with a response containing a client side language script having a computational challenge but that does not include a requested resource, wherein execution of the client side language script by the one or more of the clients causes the one or more of the clients to generate a client side execution result that is included with one or more subsequent requests from the one or more of the clients related to the requested resources,
      send the one or more subsequent requests for the resources to the server when the client side execution result included therein is determined to be correct based on a comparison of the client side execution result to one or more expected values,
      receive one or more responses containing the requested resources from the server, and
      provide the requested resources back to the requesting one or more of the clients.

7. The network traffic management apparatus of claim 6, wherein the client side execution result is included in an HTTP cookie that is sent with the one or more subsequent requests from the one or more of the clients or in any header within the one or more subsequent requests.

8. The network traffic management apparatus of claim 6, wherein the one or more processors are further configured to be capable of executing the stored programmed instructions to drop another one or more subsequent requests from the one or more of the clients that contain an incorrect client side execution result or upon not receiving any subsequent requests from the one or more of the clients when the determination indicates that the server is operating outside the range of expected parameters.

9. The network traffic management apparatus of claim 6, wherein the one or more processors are further configured to be capable of executing the stored programmed instructions to select the client side language script from among a plurality of client side language scripts for including in the response to the one or more of the clients based on a variable length of script execution time and a determined latency of a plurality of responses received from the server.

10. The network traffic management apparatus of claim 6, wherein the one or more processors are further configured to be capable of executing the stored programmed instructions to determine that a potential network attack is taking place based on one or more of:
    a determination that the server is operating outside the range of expected parameters; or
    collected data regarding particular clients, client requests, requested resources, particular servers, server applications, or server resources, wherein the collected data comprises latencies, page traversal rates, fingerprints, or access statistics.

11. A non-transitory computer readable medium having stored thereon instructions for mitigating network based attacks comprising executable code which when executed by one or more processors, causes the one or more processors to:
    determine when a server is operating outside a range of expected parameters based on one or more server-side metrics, and when the determination indicates that the server is operating outside the range of expected parameters:
       respond to one or more of a plurality of clients, from which a plurality of requests for resources hosted by the server have been received, with a response containing a client side language script having a computational challenge but that does not include a requested resource, wherein execution of the client side language script by the one or more of the clients causes the one or more of the clients to generate a client side execution result that is included with one or more subsequent requests from the one or more of the clients related to the requested resources,
       send the one or more subsequent requests for the resources to the server when the client side execution result included therein is determined to be correct based on a comparison of the client side execution result to one or more expected values,
       receive one or more responses containing the requested resources from the server, and
       provide the requested resources back to the requesting one or more of the clients.

12. The non-transitory computer readable medium of claim 11, wherein the client side execution result is included in an HTTP cookie that is sent with the one or more subsequent requests from the one or more of the clients or in any header within the one or more subsequent requests.

13. The non-transitory computer readable medium of claim 11, wherein the executable code when executed by the one or more processors further causes the one or more processors to drop another one or more subsequent requests from the one or more of the clients that contain an incorrect client side execution result or upon not receiving any subsequent requests from the one or more of the clients when the determination indicates that the server is operating outside the range of expected parameters.

14. The non-transitory computer readable medium of claim 11, wherein the executable code when executed by the one or more processors further causes the one or more processors to select the client side language script from among a plurality of client side language scripts for including in the response to the one or more of the clients based on a variable length of script execution time and a determined latency of a plurality of responses received from the server.

15. The non-transitory computer readable medium of claim 11, wherein the executable code when executed by the one or more processors further causes the one or more processors to determine that a potential network attack is taking place based on one or more of:
   a determination that the server is operating outside the range of expected parameters; or
   collected data regarding particular clients, client requests, requested resources, particular servers, server applications, or server resources, wherein the collected data comprises latencies, page traversal rates, fingerprints, or access statistics.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
   determine when a server is operating outside a range of expected parameters based on one or more server-side metrics, and when the determination indicates that the server is operating outside the range of expected parameters:
      respond to one or more of a plurality of clients, from which a plurality of requests for resources hosted by the server have been received, with a response containing a client side language script having a computational challenge but that does not include a requested resource, wherein execution of the client side language script by the one or more of the clients causes the one or more of the clients to generate a client side execution result that is included with one or more subsequent requests from the one or more of the clients related to the requested resources,
      send the one or more subsequent requests for the resources to the server when the client side execution result included therein is determined to be correct based on a comparison of the client side execution result to one or more expected values,
      receive one or more responses containing the requested resources from the server, and
      provide the requested resources back to the requesting one or more of the clients.

17. The network traffic management system of claim 16, wherein the client side execution result is included in an HTTP cookie that is sent with the one or more subsequent requests from the one or more of the clients or in any header within the one or more subsequent requests.

18. The network traffic management system of claim 16, wherein the one or more processors are further configured to be capable of executing the stored programmed instructions to drop another one or more subsequent requests from the one or more of the clients that contain an incorrect client side execution result or upon not receiving any subsequent requests from the one or more of the clients when the determination indicates that the server is operating outside the range of expected parameters.

19. The network traffic management system of claim 16, wherein the one or more processors are further configured to be capable of executing the stored programmed instructions to select the client side language script from among a plurality of client side language scripts for including in the response to the one or more of the clients based on a variable length of script execution time and a determined latency of a plurality of responses received from the server.

20. The network traffic management system of claim 16, wherein the one or more processors are further configured to be capable of executing the stored programmed instructions to determine that a potential network attack is taking place based on one or more of:
   a determination that the server is operating outside the range of expected parameters; or
   collected data regarding particular clients, client requests, requested resources, particular servers, server applications, or server resources, wherein the collected data comprises latencies, page traversal rates, fingerprints, or access statistics.

* * * * *